(12) United States Patent
Bursal (10) Patent No.: US 6,383,110 B1
(45) Date of Patent: *May 7, 2002

(54) NESTED MODIFIED-CAM SPEED CONVERTER

(75) Inventor: Faruk H. Bursal, Waltham, MA (US)

(73) Assignee: Synkinetics, Inc., Lowell, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/280,390

(22) Filed: Mar. 29, 1999

(51) Int. Cl.$^7$ .............................................. F16H 25/06
(52) U.S. Cl. ...................................... 475/196; 476/36
(58) Field of Search ................... 74/63, 650, 216.3, 74/424.5; 475/196; 476/36

(56) References Cited

U.S. PATENT DOCUMENTS

| | | | |
|---|---|---|---|
| B16,186,922 B1 | 2/1901 | Bursal et al. ................ | 476/18 |
| 1,689,285 A | 10/1928 | Knab | |
| 1,738,662 A | 12/1929 | Morison | |
| 1,946,358 A | 2/1934 | Porsche et al. | |
| 2,416,583 A | 2/1947 | Hartley et al. | |
| 3,227,005 A | 1/1966 | Johnson | |
| 3,641,842 A | 2/1972 | Hewko ..................... | 74/665 K |
| 4,735,616 A | 4/1988 | Morison | |
| 4,838,741 A | 6/1989 | Dumoulin .................. | 409/131 |
| 5,312,306 A * | 5/1994 | Folino ....................... | 475/196 |
| 5,397,279 A | 3/1995 | McCotter, Jr. ............. | 475/196 |
| 5,499,963 A * | 3/1996 | Fujimoto et al. ........... | 483/56 |
| 5,533,424 A | 7/1996 | Mimura ...................... | 74/650 |
| 5,577,423 A | 11/1996 | Mimura ...................... | 74/650 |
| 5,680,979 A | 10/1997 | Weis .......................... | 226/111 |
| 5,683,323 A | 11/1997 | Imase ......................... | 475/168 |
| 5,989,144 A | 11/1999 | Chen et al. ................. | 475/168 |
| 5,989,145 A * | 11/1999 | Bursal et al. ............... | 475/196 |
| 6,039,672 A * | 3/2000 | Bursal ........................ | 476/36 |
| 6,068,573 A * | 5/2000 | Folino et al. ............... | 476/36 |

FOREIGN PATENT DOCUMENTS

| | | | |
|---|---|---|---|
| DE | 3906053 A1 * | 8/1990 | |
| FR | 2346611 | 10/1977 | ................ 74/650 |
| JP | 59-133863 | 8/1984 | |
| JP | 60-168954 | 9/1985 | |
| JP | 11-002309 * | 1/1999 | |
| JP | 411002309 A | 1/1999 | |
| SU | 1257-331 A | 2/1985 | |
| SU | 1399-548 A | 12/1986 | |
| SU | 1490-362 A | 5/1987 | |
| SU | 1368545 * | 1/1988 | ................ 475/196 |
| SU | 1821597 A1 | 10/1990 | |

OTHER PUBLICATIONS

"Balls Reduce Speed and Transmit Torque", *Mechanical Engineering & Technology Guide*,; publ. prior to Mar. 14, 1991.

Dojen™ Precision Rotary Actuator Designer's Guide (Dir. of Lenze, Woburn, MA), published prior to Mar. 14, 1991.

"General Information on Sinusoidal Ball Drives", *Soviet Engineering Research*, vol. 6 (1986) Feb., No. 2 @ pp. 23–26, Mowbray, Leicestershire G. B. (also referenced as *Sov. Engineering Research*, V. Mashinostroeniya, Jun. 1986, Issue 2, pp. 24–28).

* cited by examiner

Primary Examiner—Charles A Marmor
Assistant Examiner—Ankur Parekh
(74) Attorney, Agent, or Firm—Perkins, Smith & Cohen, LLP; Jerry Cohen; Jacob N. Erlich (57) ABSTRACT

A method and apparatus are provided for smoothing the transition in rolling element/cam type nested speed converters and as motorized in a compact pancake package. More specifically, the apparatus for translating motion from a first to a second velocity includes drive devices made up of a conjugate pair of devices and a motion translating device mounted about a common axis. The pair of conjugate devices includes a first cam and a second cam. Each of the cams has at least one flank, the flank having a main drive segment formed according to a first function and at least one transition segment formed according to a second function. In one embodiment, the motion translating device, which is radially nested in between the two cams, has a plurality of radially extending slots, each slot containing one of a plurality of elements. The element is capable of traveling radially within its respective slot.

16 Claims, 12 Drawing Sheets

NESTED MODIFIED-CAM SPEED CONVERTER

BACKGROUND OF THE INVENTION

The present invention relates to mechanical power transmissions, and more particularly, to speed reducers and the like.

Speed conversion is an important capability in the efficient utilization of rotary motive force. The occasion often arises for increasing or reducing of the speed of a drive member to a higher or lower speed at a driven member. In automobiles, for example, a hydraulic transmission, with various combinations of gear assemblies, accomplishes the task of translating the high rotary speed of the gasoline engine to the lower rotational requirements at the driven axle. Typically, such transmissions are quite complex, requiring many parts to operate in sophisticated synchronization, and are quite labor intensive for both assembly and service. Other speed conversion applications include elevators, where an electric motor typically is employed for lifting and lowering the elevator cab, and robotics, where an electric motor is employed as an actuator to effect motion. Typically in these applications, the speed reducer housing is mounted ("grounded") directly to the equipment housing. At times the effect of speed reduction is also referred to as torque amplification, and these concepts may be treated as interchangeable, for purposes of this disclosure.

It is therefore an object of the present invention to provide a speed converter which is simplified in nature but is robust in transmission capability.

It is a further object of the present invention to provide a speed converter which is relatively easy to assemble and service.

It is an additional object of the present invention to provide a speed converter design which is adaptable to a variety of situations.

SUMMARY OF THE INVENTION

These and other objects are well met by the presently disclosed nested speed converting transmission. In one aspect of the invention, rotary motion is translated from a first speed at the input, such as from a motor, to a second speed at the load, using a nested set: including a pair of wavy devices, a slotted device between the pair, and an oscillatable translating arrangement, preferably using ball or roller type translating elements loaded in the slots of the slotted device. In a preferred embodiment of the invention, two of the devices are rotatable about a common axis with the third device fixed about that axis. In an alternative embodiment, the third device is also rotatable about the same axis.

For ease of description, the cam devices described herein may also be referred to as gears or cam-gears and the cam cycles may be referred to as teeth or cam-gear teeth, all interchangeably and without limitation. A device with two gears, a slotted part and interacting elements is described herein, also more generally referred to as three disks and interacting elements. These interacting elements may be balls, rollers, pins, bushings, ball bearing assemblies, or the like, or any combination thereof, and such terms may be used interchangeably herein. The terms drive and driven may be applied to various ones of the three disks, depending upon an application.

The invention is applicable to an accelerating or decelerating input, whether clockwise or counter-clockwise rotating, with reversing or non-reversing output, backdriveable or non-backdriveable.

A preferred embodiment includes a speed converter apparatus for translating an input at a first velocity to an output at a second velocity. The speed converter has a primary drive disk defining a primary cam (a "drive" cam) for providing a rotary motion input at a first angular velocity.

The speed converter apparatus also includes a driven assembly. The driven assembly has a secondary cam on a secondary disk, and an intermediate disk element. The intermediate disk is a directional element, located between the primary and secondary disks. The intermediate disk has slots for receipt of transmission elements (balls) therein. The speed converter output is taken from a driven disk, which is either the intermediate disk or the secondary disk.

In various embodiments, the primary and secondary cams are each formed on a face of a respective primary and secondary disk, and the slots are formed as radial slot paths in the intermediate disk. Each of the primary and secondary cams has a respective flank. Projections of these flanks intersect at unique points upon rotation of the primary cam, associated ones of these unique points defining respective ones of the slot paths in the intermediate disk.

A respective ball in a respective slot path is driven radially between a maximum and minimum radius by the primary cam. In one embodiment, the slotted intermediate disk is a reaction disk for reacting the drive force on the balls in the slots, and the secondary cam is driven into rotation by action of the oscillating balls. In another embodiment, the slotted intermediate disk is driven into rotation by action of the oscillating balls, with the drive force on the balls being reacted by the secondary cam, where the secondary disk is a reaction disk.

Overall, the primary cam is designed to cause a linear displacement of the balls for a given cam rotation. The secondary cam is configured for conjugate action with the primary cam, and which results in constant linear velocity of the radially traveling balls. The primary and secondary cams are thus referred to as a conjugate pair. The centerline of a respective slot is defined as the loci of the contact of the cams at the slots' given angular location.

In one embodiment, the primary cam contour varies substantially linearly with angular rotation at a first rate of variation. The secondary cam contour varies substantially linearly with angular rotation at a second rate of variation. The relationship of these variations determines the speed conversion ratio of the apparatus. In accordance with the foregoing, the speed ratio of the apparatus can be determined by comparing the number of cycles of the secondary cam to the number of cycles of the primary cam.

In this embodiment of the invention, the first cam device is formed as a face cam on the primary cam disk, and in simplest form has one lobe (or cycle) starting at a base circle radius and proceeding about the center of the disk at a constantly increasing radius and at a constant angular rotation to a maximum radius at 180°, i.e., in the rise mode, and then proceeding in the fall mode at a decreasing radius of the same rate and constant angular rotation back to the original base circle radius, completing 360°.

The second cam device is formed as a multi-cycle face cam track on a second cam disk, and is mounted in a position facing the face cam track of the primary cam disk. Each cycle of this face cam track defines a rise mode and a fall mode. Each rise and fall mode of the plurality of cycles in the secondary cam are configured to have the same radial displacement, for uniform conversion during the main drive segment of the cams.

In a preferred embodiment of the invention, the ends of the cam segments that are modified for easing the transition of the balls changes the rate of ball travel in a controlled deceleration or acceleration.

A multi-stage drive with a through way for wire bundle run through the drive mechanism's center is also disclosed.

In one embodiment of the invention, the first of the wavy pair of devices, and preferably a conjugate pair of devices, is coupled to an input of the translation arrangement and the second of the pair is coupled to an output of the translation arrangement, such that motion of the first of the devices can be translated to motion of the second of the devices by the translation arrangement, with the slotted device being part of the translating arrangement.

In one embodiment, the conjugate pair includes a drive cam gear and a driven cam gear. A first one of the cam-gears has at least one tooth and a second one of the cam-gears has at least one additional tooth. The translation arrangement has a slotted disk with at least one radially extending slot for interaction with an interacting element (such as a ball or a roller). Preferably a multiplicity of slots are defined by the slotted disk, each slot for receipt of a respective interacting element. Preferably the wavy pair are conjugate in that their intersection will define the center line of each slot of the slotted device.

In another aspect of the invention, a method is provided for translating the speed of a drive shaft which is driven at a first speed to the speed of a driven shaft at a second speed. The method includes the steps of providing a drive element having a drive cam, a driven element having a driven cam, and at least one reciprocating transfer element interacting between the two cams in a slotted retainer, whereby the driven cam can be driven at the second speed by the drive cam driven at the first speed.

In a particular high torque embodiment, parallel tracks are provided on the drive cam and on the driven cam, with an additional set of slots. Each pair of tracks defines a speed converter. The slotted disks may be formed as part of a single disk.

An example of the present invention in a disk-type or pancake-type transmission embodiment, the rotary motion and angular velocity of one of the three disks is efficiently translated via the translating means into rotary motion and angular velocity of a second of the disks.

The surfaces of the balls (or rollers) and the flanks or surfaces of the cam-gears and of the slots that interact with the balls (or rollers) may be referred to collectively as "working surfaces" of the transmission apparatus. The term track herein should be understood as to refer to the path of the interacting element on a working surface. An ideally designed track and ball type speed converter described herein may offer zero backlash from perfect interaction of all working surfaces, but this is difficult to achieve in reality according to typical tolerance deviations introduced into the manufacturing process. Furthermore, to achieve anything close to perfectly configured and perfectly interacting parts puts substantial burden upon quality control in the manufacturing process and in the interaction of the elements of the device as assembled.

Unlike most speed conversion devices in use today where very few interacting elements at any time transmit the total torque throughput, the present invention involves many interacting elements at one time to share the torque throughput. We have found that to accomplish this increased torque transmission, two very critical requirements must be satisfied. Firstly, the juxtaposition of all the rolling elements must be precisely maintained at all times and, secondly, the progress of the rolling elements within the physical opening provided by the cooperating working surfaces must not result in restrictions whereby the opening is less than the size of the rolling element.

We have further determined that in the manufacturing process, tolerances must be allowed, and no matter how tight they may be, there are accumulations of all the involved parts that will adversely affect both juxtaposition and the physical opening presented to the rolling elements. The manifestation of these accumulations will result in restrictions in the openings and errors in the juxtaposition of the balls, which will impair the conjugate action of the transmission.

These juxtaposition errors and physical restrictions result in loss of torque throughput, lower efficiency, higher contact pressures, lower torque capability, and possibly premature failure. This can be readily shown from results of rolling element/track distortion as a function of the applied forces for a desired torque throughput, especially for the case that maximizes the torque throughput for the highest acceptable contact stress. Under these conditions, distortions are measured in terms of 0.0002 to 0.0004 inches. It can be readily seen that, even with tight tolerances, accumulations of 0.001 to 0.002 inches are possible, without heroic efforts to achieve near perfection. Accordingly, any restrictions or juxtaposition errors resulting from the accumulated magnitudes above will impose severe forces at the interfaces of the elements that will result in unacceptable contact pressures that will lead to premature failures and at the same time reduce the torque throughput and efficiency, significantly.

In practice of the present invention, we have found that these tolerance accumulations can seriously impact performance. To overcome this serious problem, we accommodate these tolerance accumulations and minimize their effect on efficiency, on wear, and on contact pressures. This is based on the recognition for the need for compliance at the working surfaces. We further have found that the amount of compliance must both accommodate the tolerances issue and be in concurrence with the predicted loads that the rolling elements are transferring. This relationship will establish the required compliance to ensure the relatively free passage of the rolling elements throughout the conjugate action of all the rolling elements. Such accommodation of tolerance accumulations can significantly enhance the performance of the speed converter and maximize the efficient torque throughput at acceptable contact pressures at the working surfaces.

In another embodiment of the invention, we also use compliance in a manner that radial and circumferential bias is provided between the balls and tracks of the speed converter. The circumferential bias is directed across the travel path of the interacting elements and reduces backlash in the device.

In a preferred embodiment, the track parts, slotted part and/or the interacting elements, are made of a resilient or compliant material, which allows them to deform when under load and so to adapt to tolerance differences in the device. However, it is also essential that such accommodation scheme not itself require tight tolerances or otherwise impede the performance of the device nor put extra burden on the manufacturing process.

In one pancake-type embodiment, having a first and second track device and a device with slots, the interacting element is a compliant spring-like rolling element. The element can roll radially in and out along its associated slot while also being resilient radially and circumferentially. In one embodiment this compliant element is a resilient polymer ball that rolls along the tracks of the cam-gears and along the associated slot flanks. In another embodiment this compliant element is a hollow roller. The purpose of the compliance is accommodation of tolerances, and thus can be achieved using compliant or resilient structures or materials, performing a spring-like tolerance accommodation function.

In one practice of the invention, the cam-gears are loaded up so that their tracks apply a compression to the ball which causes it to deform at least circumferentially in the direction of the sides of the slot. Thus the ball nearly or in fact actually contacts both sides of the slot when so loaded. This reduces backlash in the device. If the balls as a group do not touch both sides of the slots then the driven cam gear disk can be rotated in the opposite direction in which it has been rotated for some measurable backlash amount before obtaining adequate engagement between all working surfaces of the tracks, slot and ball. Thus providing a ball that already is in contact with all such working surfaces assures substantial reduction in this backlash amount. This biasing can be achieved by a combination of selection of a ball made of resilient (also referred to herein as compliant) material and slightly oversized for the slot. Now backlash can be substantially reduced with these compliant/resilient members.

We define backlash as a control issue. If there is no backlash then there is no dead zone in response between rotation at the input and output. System backlash is distinguished from system compliance; where even if there is no backlash, the mechanism may still experience a "windup" as it is loaded, and this is a measure of system compliance. Material compliance of a particular component is also distinguished from system compliance, in that the latter is a measure of cooperation of all system components and is only indirectly a function of the former.

In yet another embodiment of the invention, the features are designed to obtain near-optimal cooperation between precision formed working surfaces, and in addition, at least one of these working surfaces is intentionally formed in a manner that imparts anti-backlash cooperation between at least a minimum of working surfaces. In one embodiment, this is achieved by forming the centerlines of ones of the slots with an offset from their ideal location.

In one embodiment of the present invention, the tooth shapes on the inner and outer cam-gears are altered to exhibit an asymmetry between rise and fall flanks. This causes a majority of the interacting elements to be either on the rise flank or the fall flank of the respective cam-gears rather than being split essentially equally between the two kinds of flanks. It is also possible to provide relief on the track flanks so as to ensure that the minority of the interacting elements that are on the opposite flanks from the majority do not carry any load at all. The overall result is that the interacting elements act more uniformly in concert to provide the desired action, which is to transmit angular velocity and rotary motive force between the inner and outer cam-gears.

In yet an other embodiment of the present invention, a cam-gear with asymmetric cam is paired with another cam-gear with symmetric cam and an intermediate disk or member that has slots defined by the different functions used to generate the two cam shapes, so as to act as parts of a conjugate assembly. This alternate design can also contribute to improved efficiency of power transmission and volume utilization.

For a precision drive mechanism, i.e., one requiring low backlash, preloading is important to obtain intimate and continuous contact between the flanks and balls (i.e., between the working surfaces). Preloading will permit tolerances to be relaxed for some precision assemblies, thus reducing manufacturing costs, and will eliminate some of the effect of tolerance accumulation in an assembled stack of such devices. A further benefit of some preloading is some accommodation of any wear in the tracks of these units without effecting performance. In a precision power transmission device, it is important to minimize wear to prevent increase of backlash; furthermore, it is even advantageous to anticipate and accommodate such wear and other tolerance buildups to prevent increase of backlash.

A favored aspect of the invention is the ability to design compliance into the working apparatus so as to militate against the problems associated with manufacturing imperfections, such as can cause tight spots between the working components. These tight spots result in stress spikes in power transmission, which in turn can cause loss of efficiency and reduces life expectancy of the apparatus. The designed compliance of the invention can beneficially eliminate these tight spots, with the result of a more efficient and longer life product. Thus in various ones of these embodiments, where the materials are relatively soft, one or several of the working surfaces can act as a spring feature to provide a desired tolerance accommodation to achieve a desired backlash minimization and manufacturing tolerance relieving feature.

BRIEF DESCRIPTION OF THE DRAWINGS

These and other features and advantages of the present invention will be more fully understood by reference to the following detailed description in conjunction with the attached drawing in which like reference numerals refer to like elements and in which:

FIG. 2(*a*) is a sectional view on the centerline of FIG. 1, showing the top half of the reducer.

FIG. 2(*b*) is a sectional view on the centerline of FIG. 1 showing the top half in further detail.

FIG. 3(*a*) is a plan view of a single cycle drive member face cam according to an embodiment of the present invention.

FIG. 3(*b*) is a plan view of a twelve cycle driven member face cam according to an embodiment of the present invention.

FIG. 5(*a*) is a plan view of a slotted reaction disk with balls installed according to the embodiment of FIGS. 1–4.

FIG. 5(*b*) is an overlay plan view of a single cycle drive cam, twelve cycle driven cam and balls and slots of the reaction disk according to an embodiment of the present invention.

FIG. 7 (A,B) shows cams modified according to the present invention.

DETAILED DESCRIPTION OF A PREFERRED EMBODIMENT

Figure 1:
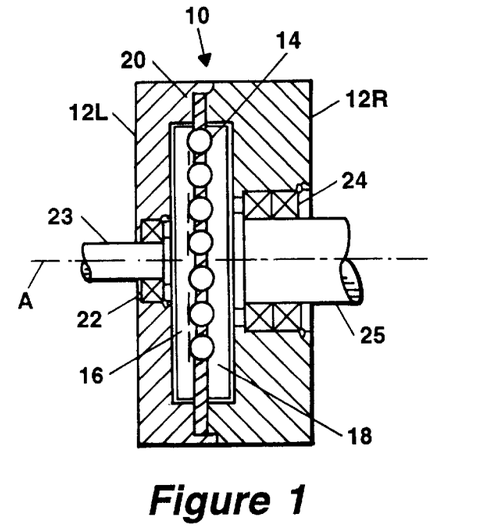
FIG. 1 is a sectional side view on the centerline of a single stage speed reducer.
Figure 2A:
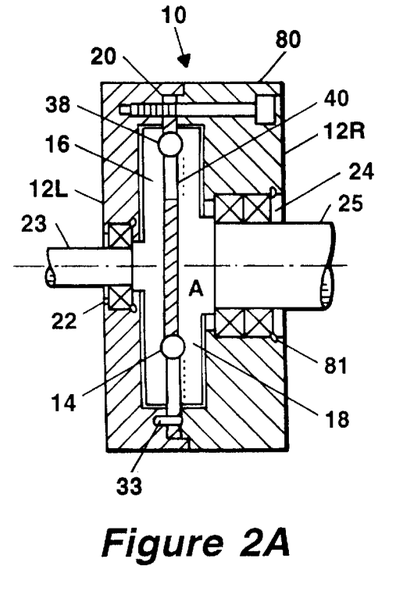
Figure 2B:
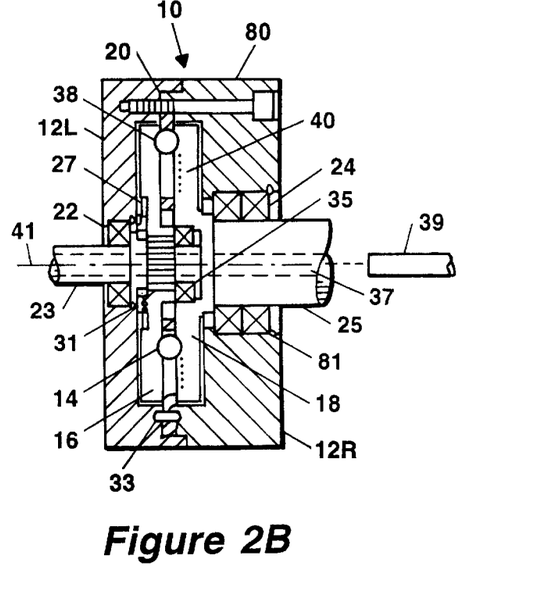
Figure 3A:
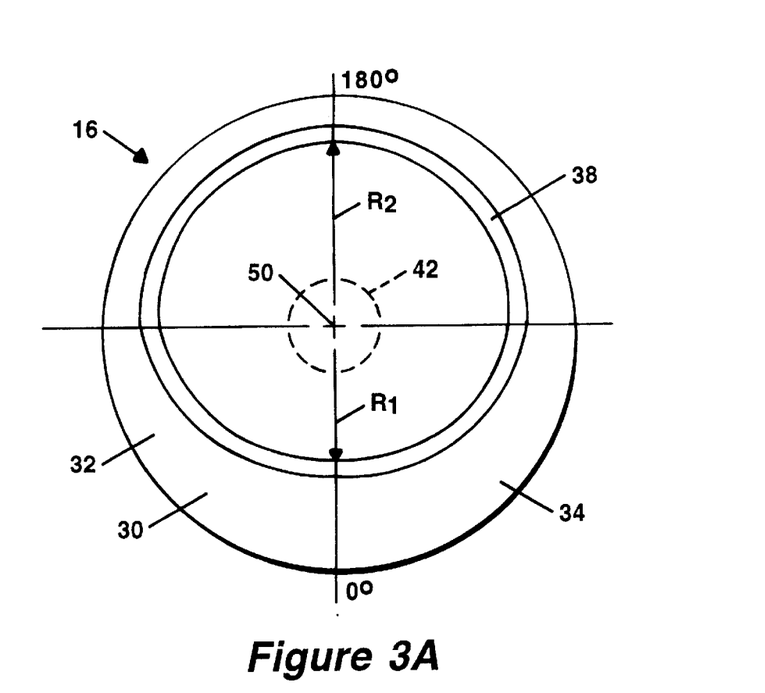
Figure 3B:
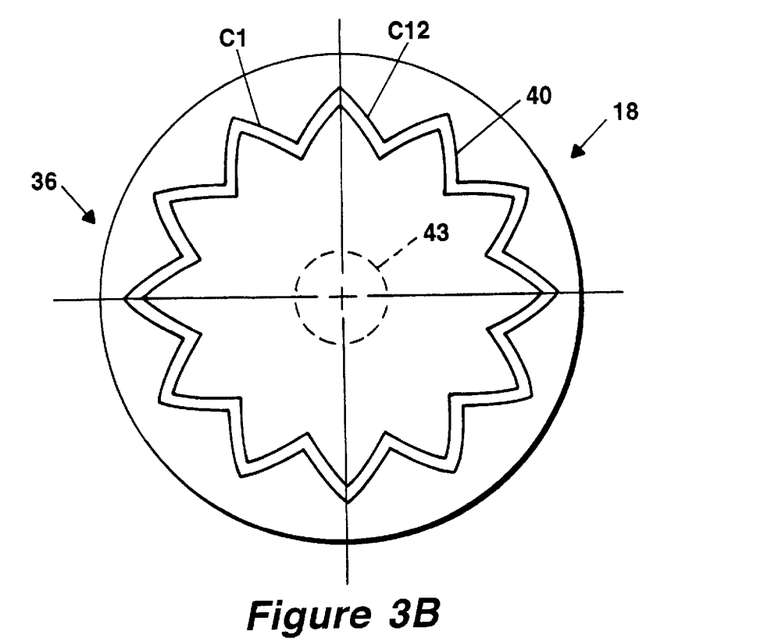

As taught in U.S. Pat. No. 5,312,306, incorporated herein by reference, a single-stage speed converter is shown in FIGS. 1 and 2. In this embodiment, the speed reducing and power transmission capability of assembly 10 is achieved by use of appropriately designed face cams on each of the drive member and driven member. The cams are interacted by the balls. FIG. 3 (A,B) shows examples of two such cams, and are shown by way of illustration and not by way of limitation of the scope of the present invention.

As seen in FIG. 3(a), drive member 16 includes a single cycle (single lobe) cam 30 which rises from $R_1$ at 0 degrees to $R_2$ at 180 degrees (defining the rise side 32 of the cam) and back to $R_1$ at 360 degrees (defining the fall side 34 of the cam). The cam is asymmetric about the vertical centerline and is generated from $R_1$ to $R_2$ in a prescribed curve relative to the center 50. The cam takes the form of a one cycle ball track 38.

As shown in FIG. 3(b), driven member 18 is preferably concentric to the shaft. In this embodiment, member 18 includes a 12 cycle (C1–C12) cam 36, taking the form of a concentric 12 cycle ball track 40. Each one of these 12 cycles accommodates the rise and fall of the single cycle drive cam, and each such accommodation rotates the driven member 1/12 of a full revolution of the driven member, in this embodiment.

Figure 4:
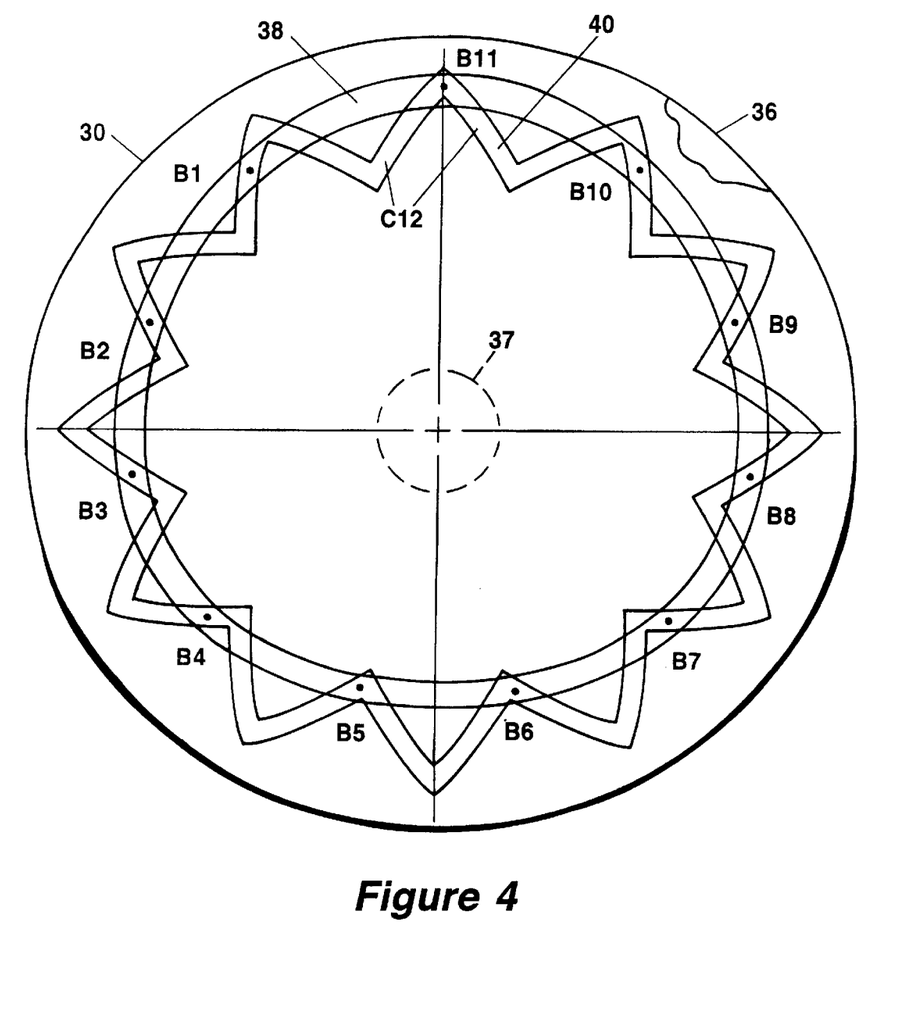
FIG. 4 is a conceptual overlay of the single cycle drive member of FIG. 3(*a*) and the twelve cycle driven member of FIG. 3(*b*).

The cooperation of the two cams of this embodiment is profiled in the overlay of FIG. 4. Cams 30 and 36, and specifically ball tracks 38, 40, are configured so as to support balls 14, FIG. 1, between them at locations B1 to B11. The balls are retained in these assigned locations by reaction disk 20. In this embodiment, the reaction disk is provided with a plurality of radial ball travel slots S1–S11, each slot being placed equidistant from its nearest neighbors and from the center 50 of the retainer.

The reaction disk has several functions. The first is to provide a reaction to the rotary motive forces that are being transmitted through the balls. This function will be described later. The reaction disk is also utilized during the assembly procedure of the speed reducer in that it will locate and retain the balls in their proper orientation and align the cams. Thirdly, at the extreme travel of the balls in slots S1–S11, the balls are assisted in their transition from a rise mode to a fall mode and in reverse.

In operation, the balls 14 translate rotation of input shaft 23 and drive member 16, FIG. 1, in a given direction (e.g., clockwise, as viewed from the input shaft), to a lower rotation of driven member 18 and output shaft 25 in the same direction. The balls translate in and out radially during rotation of the cams. There is no angular rotation of the balls or the retainer (reaction disk 20) since they are structurally coupled, see pin 33, to the stationary housing 12, FIG. 2(a). The only rotating elements in the entire assembly are the drive and driven cams.

Figure 5A:
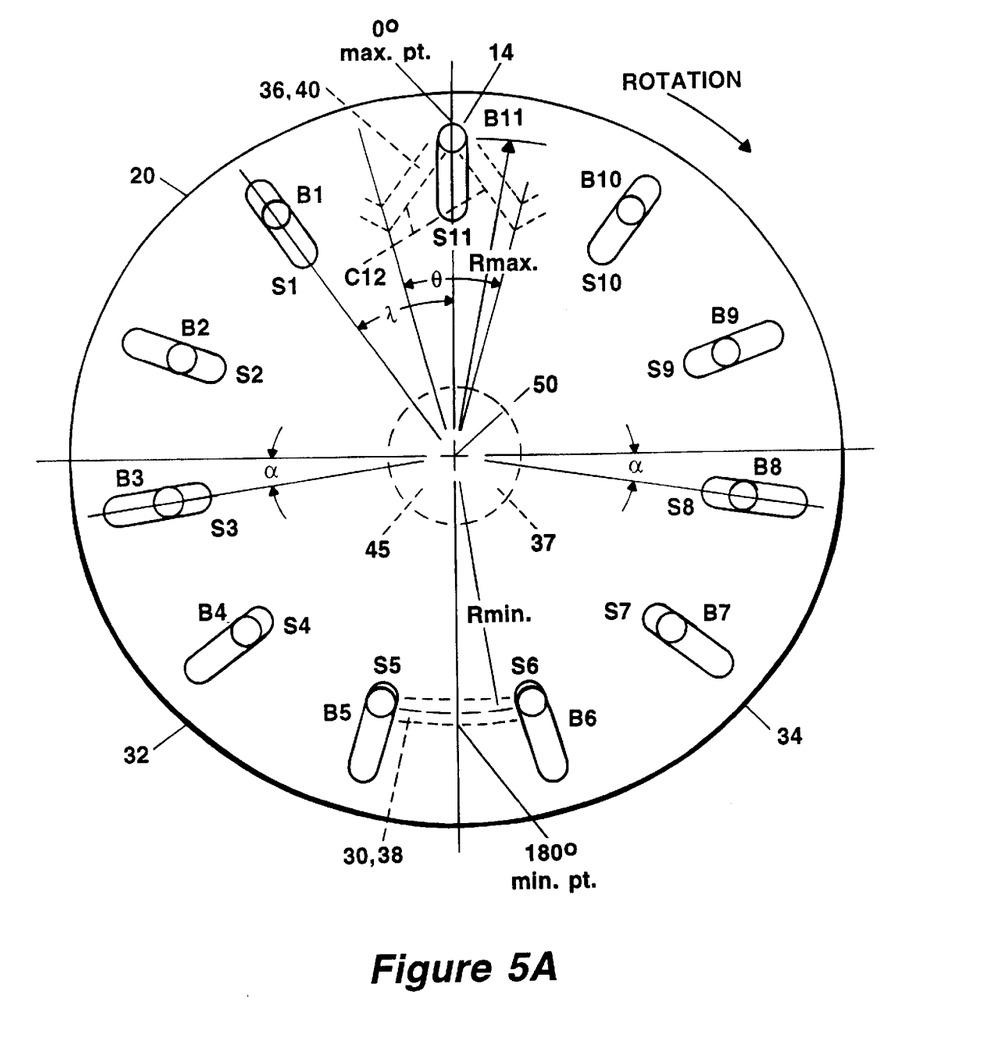
Figure 5B:
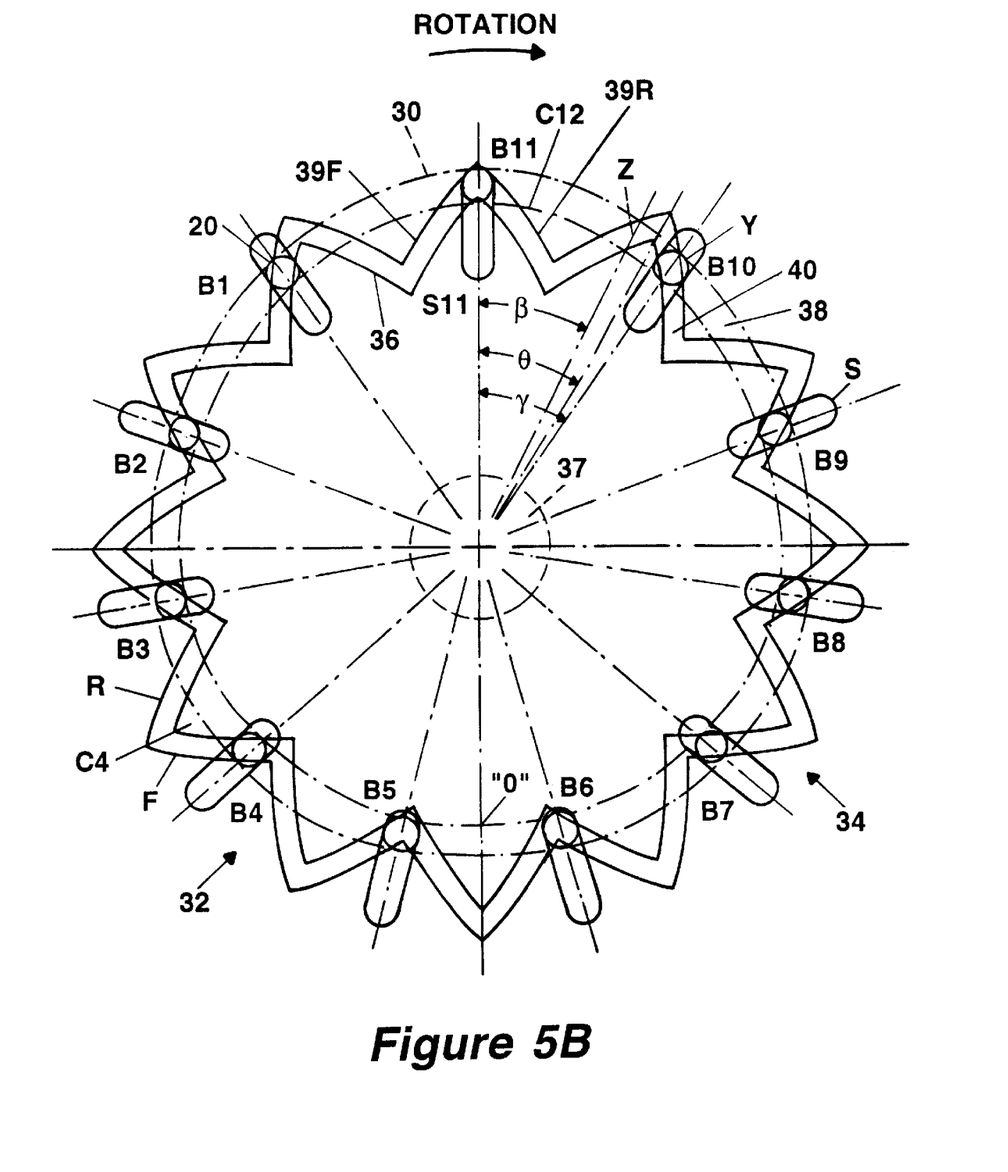

FIG. 5 shows the cooperation of the drive and driven cams and intermediate reaction disk with balls in the slots thereof of the embodiment of FIGS. 1–4. These cams are preferably formed having a rise flank R and a fall flank F on each cycle (or tooth) as shown at cycle C4. A first of these flanks traces a segment of a linear curve and the other flank traces a mirror image of that segment, when formed according to the preferred embodiment taught in U.S. Pat. No. 5,312,306.

Figure 6:
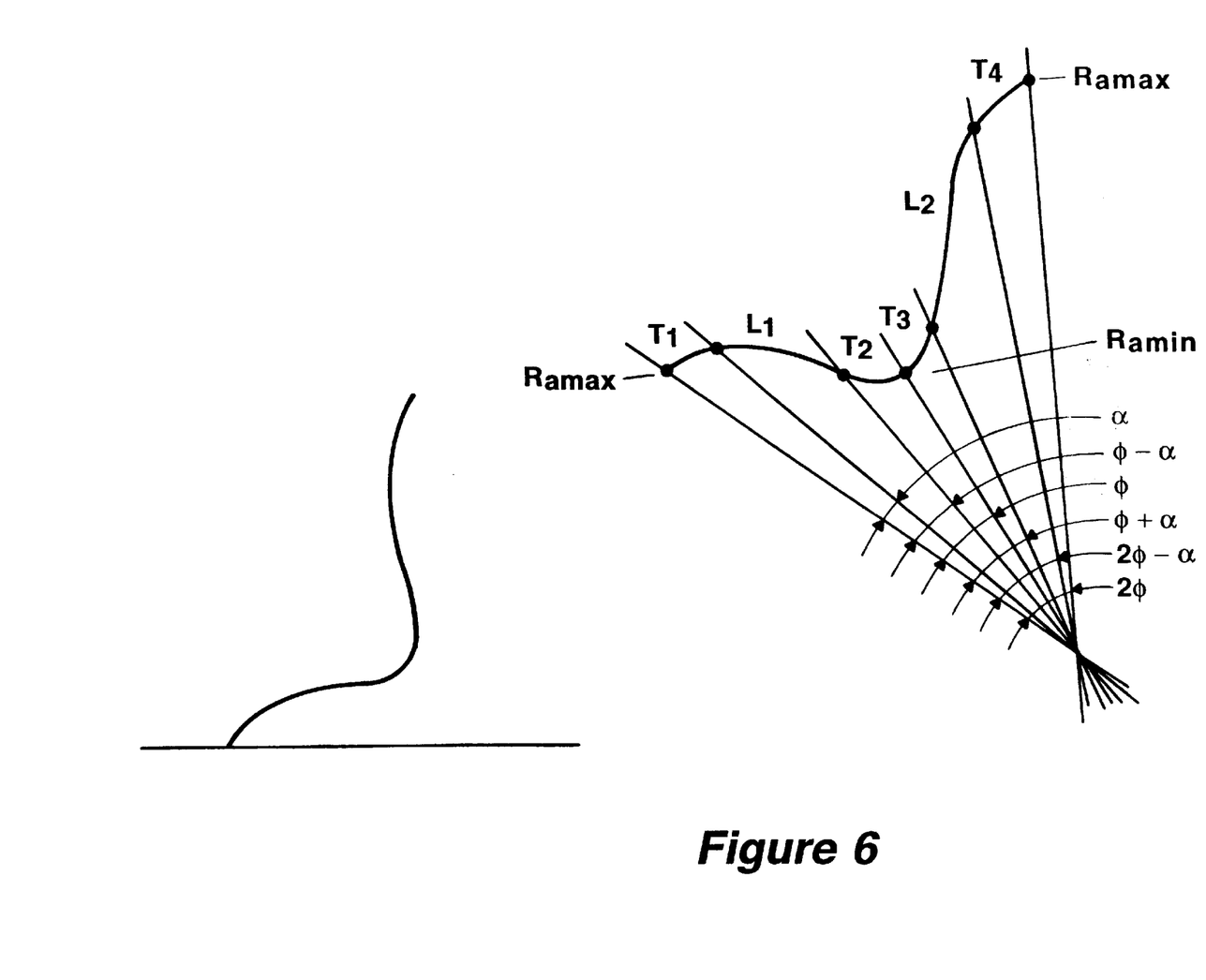
FIG. 6 shows a cam cycle having six segments according to the invention.

In practice of the present invention, each such curved segment is broken into six major parts, as shown in FIG. 6. The curve segment starts at an extreme, such as at Rmax, and extends through a transition part T1, a middle drive part L1, another transition part T2 to the other extreme, Rmin. The part then continues through transition T3, a middle drive part L2, a last transition part T4 returning to the extreme Rmax. Over the transition parts the ball is going into or leaving the transition point at the Rmin or Rmax where the ball stops its travel and changes direction in the slot S.

The sharp points of the cams shown in U.S. Pat. No. 5,312,306 indicate instantaneous transition. In practice of the present invention, the middle drive part L1 and L2 continues to be formed by the linear curve (preferably a linear spiral) as a first function, but the T1 through T4 transition parts are formed by a transition function, as a second function, to modify the cam tips to provide a smooth transition from one flank to another. Tip modification is important because of the balls traveling at a constant speed in the reaction disk slot need to change direction at Rmax and Rmin. To do this in a controlled manner requires a continuous or at least piecewise continuous ball velocity function such that, at least, the first derivatives are conserved.

The benefits are noise abatement, avoidance of sudden velocity change, reduction of wear/forces/stress at sharp corners, and control of acceleration/deceleration of the ball. The continuous/piecewise continuous function used at the transition parts Tmin and Tmax reduces instantaneous ball changes, plans for only one unloaded ball at a time, and reduces torque ripple.

The transition function is selected such that the polar slopes at Rmax and Rmin are zero (dR/dØ=0) and the drive parts L1 or L2 cam profile gets to within an small angle called the modification angle a of Rmin or Rmax with tangents that are equal at the transition. The radius can be a continuous/piecewise continuous function of the angle. For example:

$$r = f(\emptyset, \emptyset^2, \emptyset^3, \ldots, \emptyset^n)$$

$$\text{or } r = f(\sin \emptyset, \cos \emptyset, \sin h, \cos h, r, r^2 \ldots)$$

anything such continuous or piecewise continuous function.

Conjugate action is preserved by a conjugate constant.

$$CC = \text{Conjugate Constant} = (\text{number of lobes}) * (\text{modification angle}).$$

This constant allows for any speed combination to remain conjugate during tip transitions: For example:

$$CC = 30 \text{ for a } 1:12 \text{ has: } \alpha \text{ drive} = 30° \text{ and: } \alpha \text{ driven} = 2.5°$$

$$\text{and } CC = 25 \text{ for a } 2:11 \text{ has: } \alpha \text{ drive} = 12.5° \text{ and: } \alpha \text{ driven} = 2.27273°$$

For a smooth transition, this example used:

$$r = \Delta * \sin(f(\emptyset, \alpha)) \text{ and } R = \text{linear spiral} + r$$

so:

Δ is determined by setting dR/dØ=0 at Ø=0 and: over T1 at:

$0 > \emptyset > \alpha$

R=linear spiral$-\Delta*(1-\sin(90°*\emptyset/\alpha))$ and over T2 at:

$(\phi-\alpha) > \emptyset > \phi$

R=linear spiral$+\Delta*(1-\sin(90°*(\phi-\emptyset)/\alpha))$ and over T3 at:

$\phi > \emptyset > (\phi+\alpha)$

R=linear spiral$+\Delta*(1-\sin(90°*(\emptyset\phi)/\alpha))$ and over T4 at:

$2*(\phi-\alpha) > \emptyset > 2\phi$

R=linear spiral$-\Delta*(1-\sin(90°*(2\phi-\emptyset)/\alpha))$

In another example, a polynomial expansion is used to expresses the transition part. For a smooth transition, this example used: $r=\Delta*(f(\emptyset, \alpha))$ and R=linear spiral+r so:

n is any integer

A,B and A are determined by constraints:

$r=\Delta$ at $\emptyset=0$ $r=0$ at $\emptyset=\alpha$ $dR/d\emptyset=0$ at $\emptyset=0$ $dr/d\emptyset=0$ at $\emptyset=\alpha$ then:

$A=-n/(n-1)$ $B=1/(n-1)$ and: over T1 at:

$0 > \emptyset > \alpha$

R=linear spiral$-\Delta*(1+A(\emptyset/\alpha)+B(\emptyset/\alpha)^n)$ and over T2 at:

$(\phi-\alpha) > \emptyset > \phi$

R=linear spiral$+\Delta*(1+A((\phi-\emptyset)/\alpha)+B((\phi-\emptyset)/\alpha)^n)$ and over T3 at:

$\phi > \emptyset > (\phi+\alpha)$

R=linear spiral$+\Delta*(1+A)((\emptyset-\phi)/\alpha)+B((\emptyset-\phi)/\alpha)^n)$ and over T4 at:

$(2\phi-\alpha) > \emptyset > (2\phi)$

R=linear spiral$-\Delta*(1+A((2\phi-\emptyset)/\alpha)+B((2\phi-\emptyset)/\alpha)^n)$ where, $\Delta = \dfrac{(Rmax - Rmin)\alpha}{\phi A}$ to ensure $dR/d\emptyset=0$ @ $\emptyset=0$, where, $\Delta$ is the difference from the location indicated by the function of the drive part L1 and L2 (preferably a linear spiral), $\alpha$ is the modification angle, $\phi$ is the half lobe angle denoting the half way point of a complete cycle. In one example, n=2 provided good results.

Figure 7:
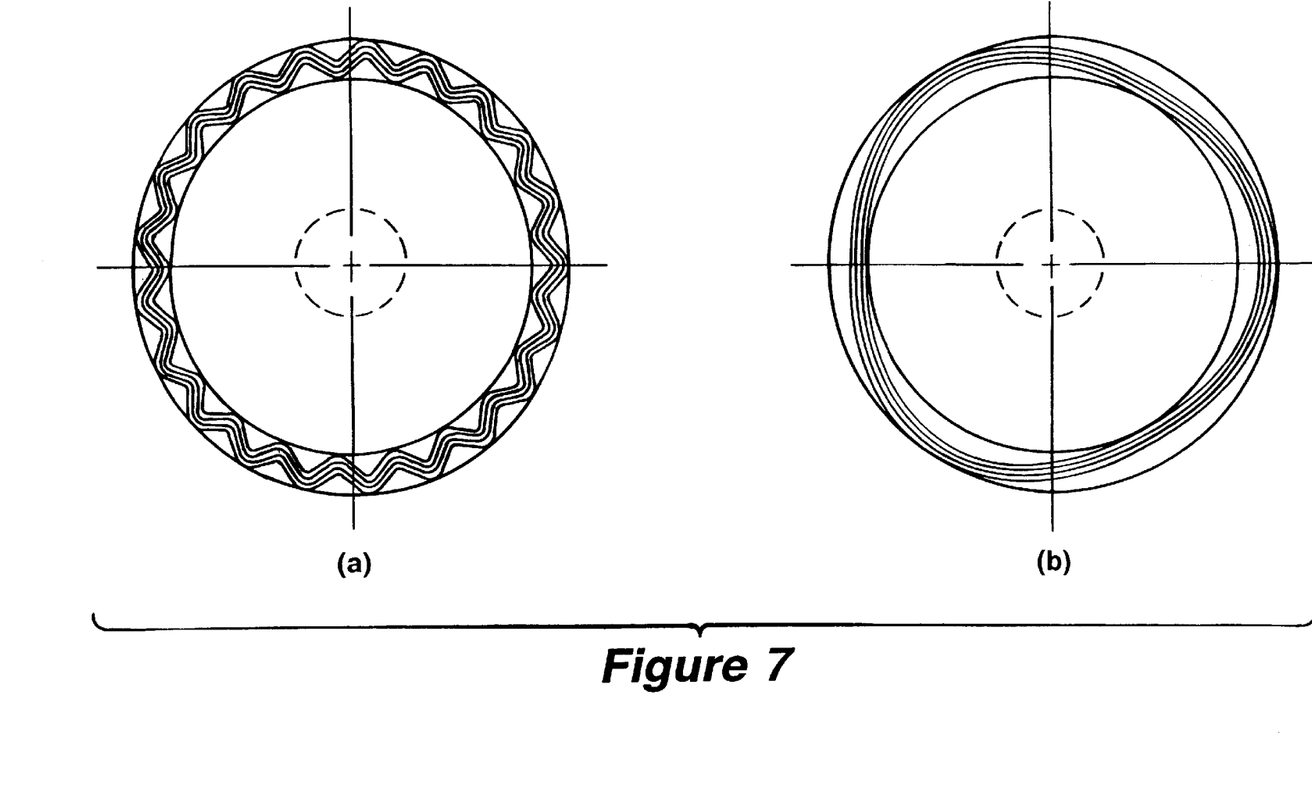

Conjugate cams formed with the above process are shown in FIG. 7(A,B) having smoother tips at each transition. The resulting device is quieter and smoother in operation.

It will now be appreciated that a speed converter made in accordance with the teachings of the present invention will have a ratio of drive cam(s) to driven cam(s) of other than unity (less than for reduction, more than for increasing). This invention has a multiplicity of applications, including: automotive transmissions, robotics applications, elevation drives, and the like. Various modifications of the specific embodiments set forth above are also within the spirit and scope of the invention. Furthermore, a translation device with other than constant angular velocity may be developed for special applications. Nevertheless, the scope of these and other embodiments is limited only as set forth in the following claims. parts. The drive cam 16, driven cam 18, and reaction disk 20 have through holes 42, 43 and 45, respectively.

Figure 8:
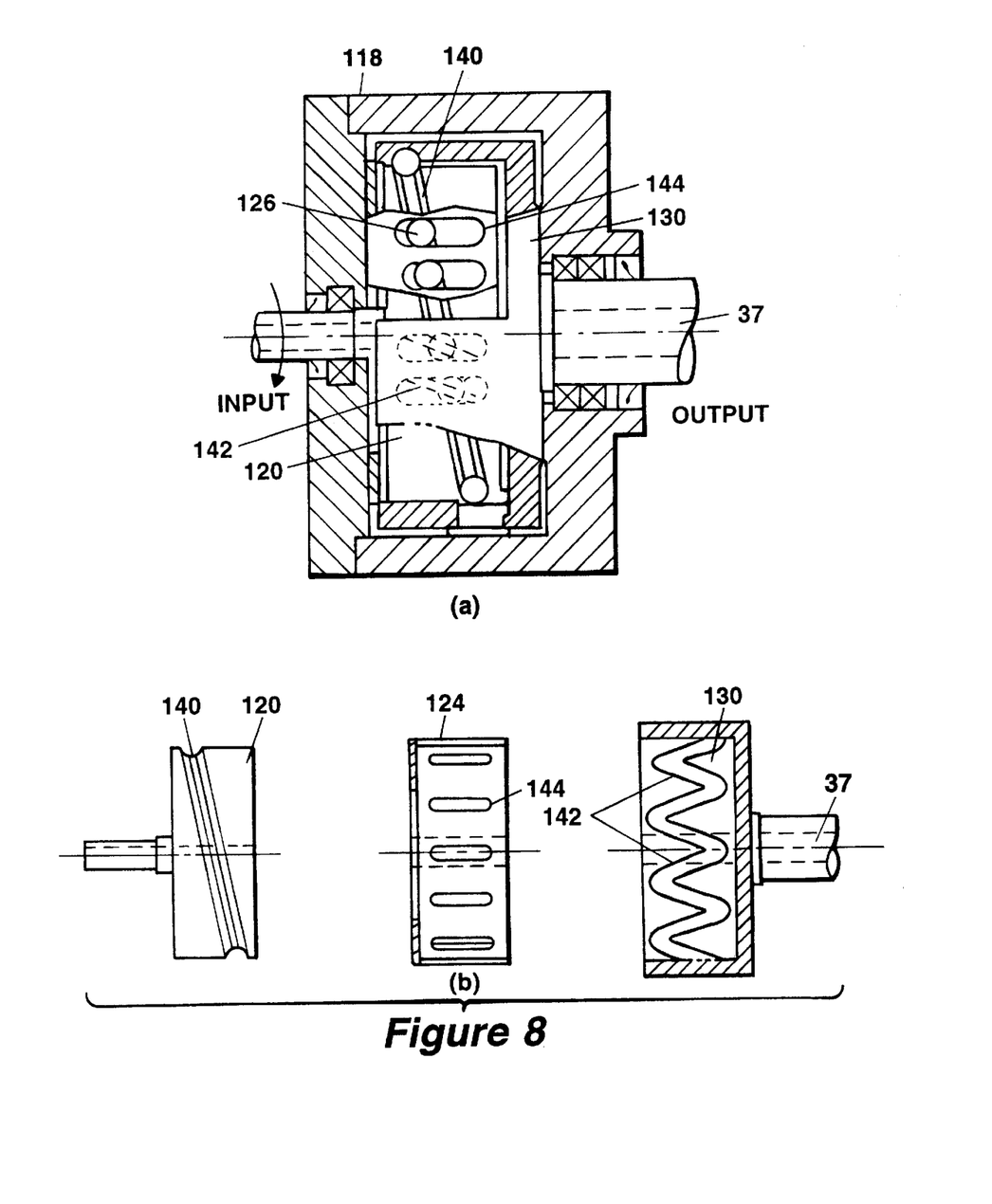
FIG. 8 shows a cylindrical embodiment of the invention.

The cylindrical embodiment of FIG. 8 also has through way 37, and has housing 118, which receives drive cam 120 with track 140, reaction disk 124 having slots 144 and driven cam 130 with its track 142. The driven disk is mounted by a bearing on a shaft and is captured to the bearing. The motion of the ball(s) 126 caused by the drive disk track 140 and reacted by the reaction disk 124 is translated to grooves 142 cut into the back surface of the driven disk 130 which causes the driven disk 130 to rotate as the drive cam is rotated.

Figure 9A:
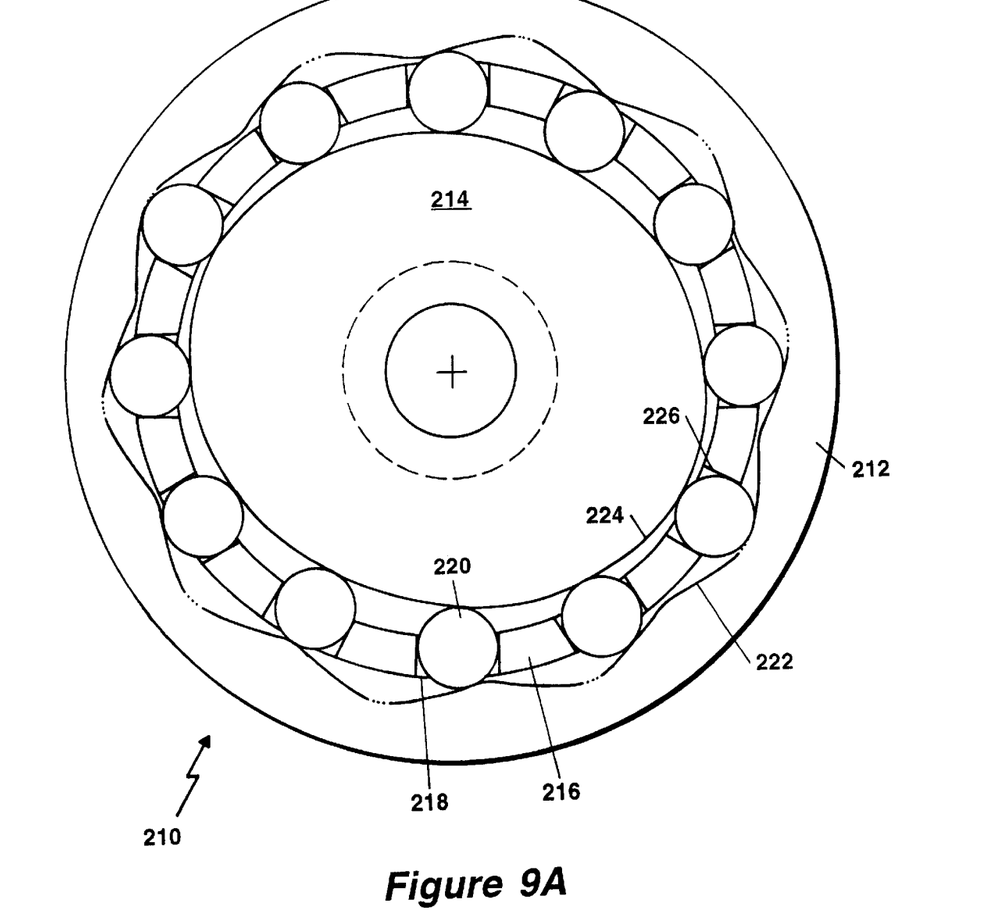
FIG. 9A is a schematic view of a single-stage embodiment of the present invention.

A single-stage embodiment of the present invention is shown in FIG. 9A where the inventive speed converter 210 includes outer gear 212, inner gear 214, slotted intermediate member 216, the latter having slots for receipt of rolling elements (balls or rollers) 220. Outer gear 212 defines tooth flanks 222. Inner gear 214 defines tooth flanks 224. Slot 218 defines its flanks 226. The outer gear has 10 teeth, the inner gear has two teeth, the slotted member has 12 slots and there are 12 rolling elements, in the example of FIG. 9A, although various other configurations are within practice of the invention.

Figure 9B:
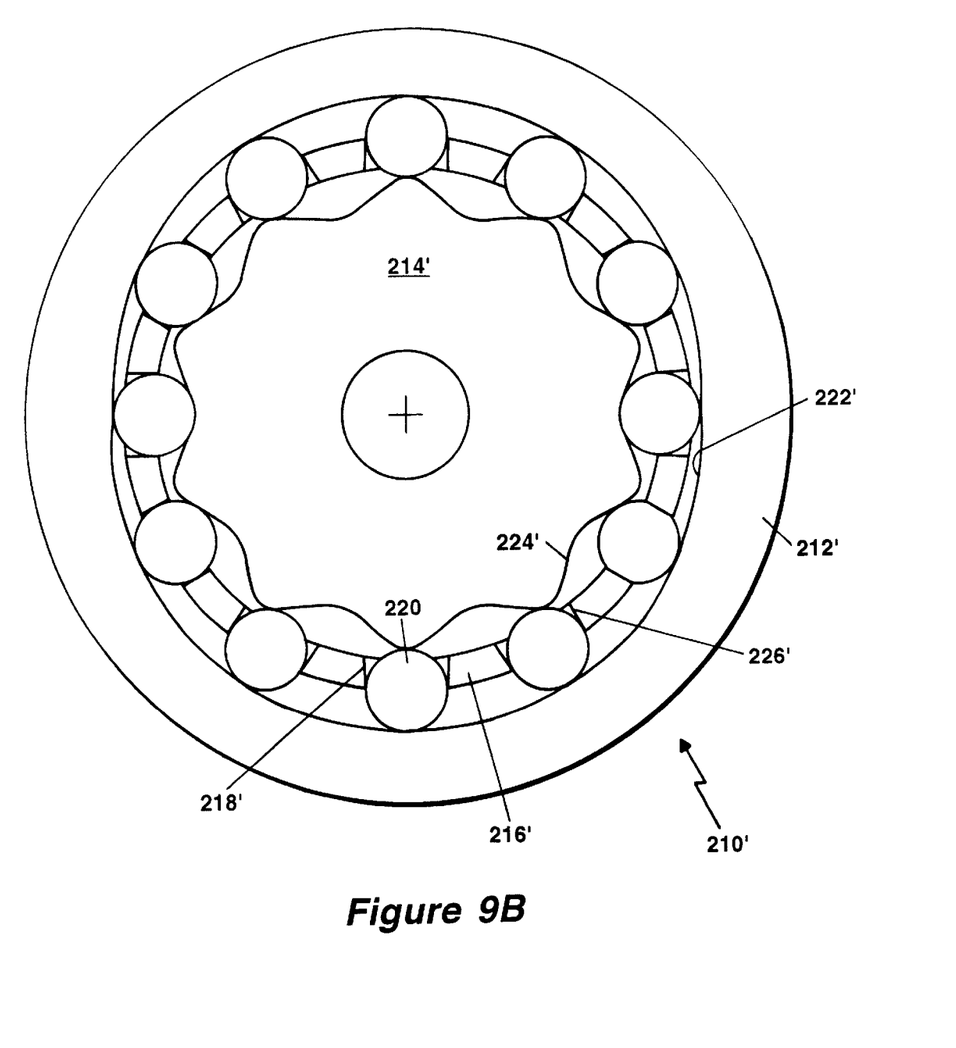
FIG. 9B is a schematic view of an alternative single-stage embodiment of the present invention.

FIG. 1B shows an alternative embodiment where the inventive speed converter 210' includes outer gear 212', inner gear 214', and slotted intermediate member 216', the latter having slots 218' for receipt of rolling elements 220'. Outer gear 212' has tooth flanks 222'. Inner gear 214' has a tooth flanks 224'. Slot 218' has flanks 226'. The outer gear has two teeth, the inner gear has ten teeth, the slotted member has 12 slots and there are 12 rolling elements.

As a functioning transmission, any of the three devices 212, 214 and 216 or 212', 214' or 16' can act as input, output, or grounded reaction member or a drive or driven member. For a given speed converter with a grounded member, there are six different possible configurations; and additional configurations are possible where no device is grounded, and then the apparatus may be harnessed to perform a differential function.

The higher number of teeth may be on either the inner or outer gear. The number of balls and thus the number of slots is either the sum of the number of teeth on the inner and outer gears, or the difference in the number of teeth on the inner and outer gears. If the number of slots is the sum, then the output will rotate in a direction opposite of the input direction, and if the number of slots is the sum, then the output will rotate in the same direction of the input.

As a speed increaser, rotation of outer gear 212 as the input drives its flanks 222 against the elements 220, which travel radially inwardly while driving against flanks 226 of the slots 218 and against flanks 224 of the inner gear disk 214 at the output. The speed increaser ratio of speed converter 210 is determined by comparing the greater number of teeth of the drive gear to the lesser number of teeth of the driven gear, which results in a 10/2:1 speed increase ratio in the example of FIG. 9A.

As a speed reducer, with the slotted member functioning as a grounded reaction member, rotation of inner gear 214 as the input drives its flanks 224 against the rolling elements 220 which travel radially outwardly while driving against flanks 226 of the slots 218 and against flanks 222 of the outer disk 212 as the output. The speed reduction ratio of speed converter 210 is determined by comparing the greater number of teeth of the driven gear to the lesser number of teeth of the drive gear, which results in a 10/2:1, or 5:1 reduction ratio in the example of FIG. 9A.

In an embodiment of the invention combining FIGS. 9A and 9B, the outer gear 216 is the input and the inner gear 214 is the output, with the slotted disk 216 grounded and acting as a reaction member. In an embodiment of the invention combining the inner gear 214 is the input and the slotted disk 216 is the output, with the outer gear 212 being grounded and acting as a reaction member. In an embodiment of the invention, the outer 212 is the input and the slotted disk 216 is the output, with the inner gear 214 being grounded and acting as a reaction member. In an embodiment of the invention, the slotted disk 216 is the input and the outer gear 212 is the output, with the inner gear grounded and acting as a reaction member. In an embodiment of the invention, the slotted disk 216 is the input and the input gear 214 is the output, with the outer gear 212 grounded and acting as a reaction member. The actual speed conversion ratio will depend on how many teeth the particular rotating parts have, and where the input is applied.

Figure 10A:
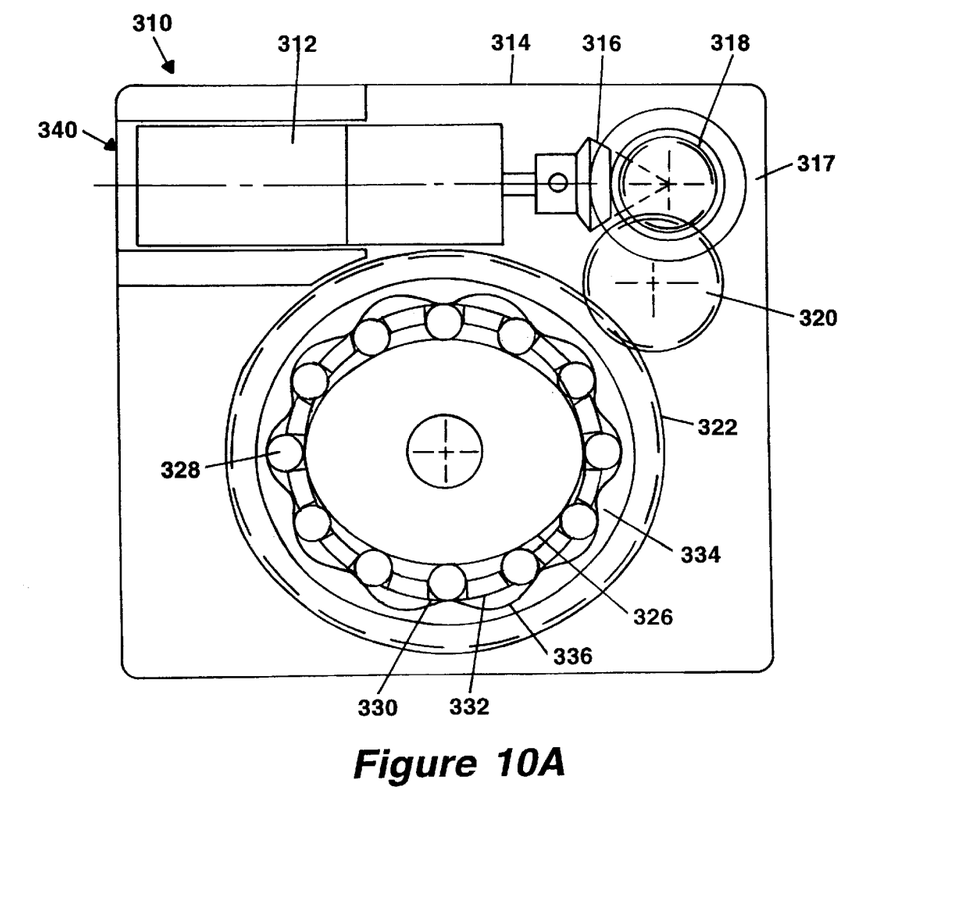
FIG. 10A is a layout view of a compact pancake motorized speed converter embodiment of the invention.
Figure 10B:
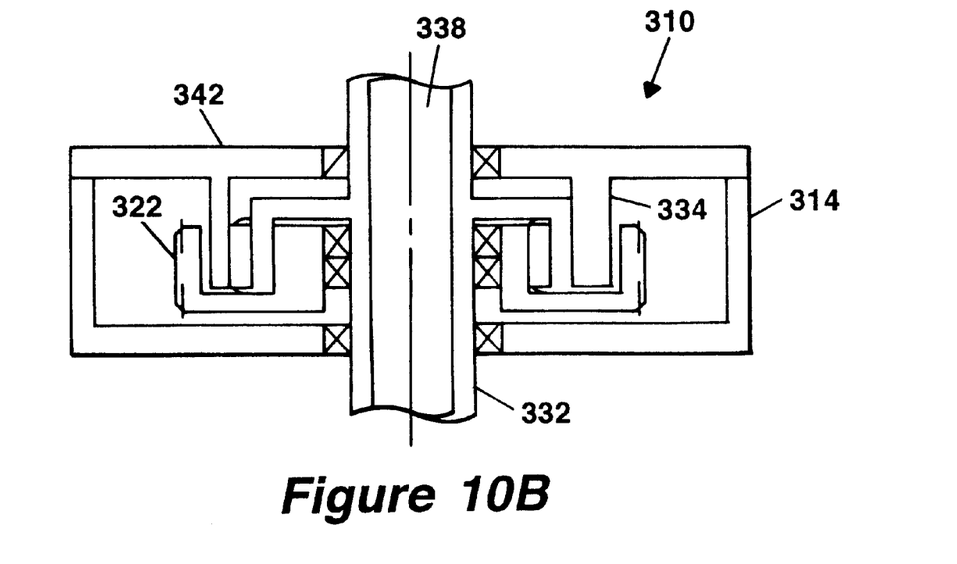
FIG. 10B is a side cross section of the embodiment of FIG. 10A.

In the pancake gearmotor 312 of FIG. 10 A,B a motor or gearmotor 312 is positioned sideways to fit within motor receiving channel 340 within a low-height, pancake housing 314, which drives the first of a set of bevel gears 316, 317. A cover 342 is also shown in FIG. 10B after this 90 degree re-orientation which may also involve a speed reduction, a spur gear pinion 318 rigidly coupled to the second of the bevel gears 317 drives an idler gear 320, which in turn drives a large spur gear 322. The large spur gear is integrally connected to a first (inner) cam-gear 324, which has a cam cut on its outer surface.

The cam surface 326 engages translating elements such as balls or rollers 328, which are housed within slots 330 in a slotted member 332. A second cam-gear 334, which has a cam 336 cut into its inner surface, encases the translating elements from the outside. In this nested embodiment, the second cam-gear is part of cover 342 or in the alternative, housing 314 (i.e., ground), while the slotted member is the output of the device. The advantage of this configuration is that a pancake gearmotor with very high overall speed reduction, high torque capacity, low backlash, high precision and substantial torsional stiffness may be obtained in a low-profile package. Also, such a gearmotor may be designed to be backdriveable or not, as desired. An optional center hole 338 through the entire assembly 310 may also be provided with ease, such as for the running of wires or other services.

These and other embodiments of the invention will now be understood by those skilled in the relevant art. Variations of these teaching are also within the scope of this disclosure.

What is claimed is:

1. Apparatus for translating motion from a first to a second velocity, the apparatus comprising
three drive devices, including a conjugate pair of the devices and a slotted motion translating device, mounted about a common axis, having an input and output rotatable about the common axis,
one of the devices translating motion of a first of the devices at a first velocity to motion of a second of the devices at a second velocity, the first of the devices coupled to an input of the slotted translating device and the second of the devices coupled to an output of the slotted translating device, whereby motion of the first of the devices can be translated to motion of the second of the devices,
wherein said conjugate devices comprise a pair of cams, one of said cams located radially internally to said slotted translating device and one of said cams located radially externally to said slotted translating device, to form a nested speed converter,
said slotted translating device further comprises a plurality of radially extending slots and a plurality of elements, with a respective one of the elements associated with a respective one of the radially extending slots being capable of traveling radially within said respective one of the radially extending slots, and
wherein the cams each form a rise flank and a fall flank, wherein a flank is formed having a main drive segment formed according to a first function and at least one transition segment formed according to a second function.

2. The apparatus of claim 1 wherein the first function is a linear function.

3. The apparatus of claim 1 wherein the first function is a spiral function.

4. The apparatus of claim 1 wherein the first function is a linear spiral function.

5. The apparatus of claim 1 wherein the second function is a piecewise continuous function.

6. The apparatus of claim 1 wherein the second function is a polynomial function.

7. The apparatus of claim 1 wherein the slotted translating device comprises a cylindrical retainer device and the elements are rollers.

8. Apparatus of claim 1 wherein the devices each define a respective central passageway extending along said axis to provide an accessible orifice extending along said axis.

9. Apparatus for translating motion from a first to a second velocity, the apparatus comprising
three drive devices, including a conjugate pair of the devices and a motion translating device, mounted about a common axis, having an input and output rotatable about the common axis,
wherein the pair of conjugate devices comprises a first cam and a second cam, the first cam located radially internally to said motion translating device and the second cam located radially externally to said motion translating device, to form a nested speed converter,
each of the cams comprising a rise flank and a fall flank, wherein one of the rise flank and fall flank is formed having a main drive segment L1 flanked by a T1 transition segment descending from radial distance Rmax from one end of segment L1 and a T2 transition segment approaching radial distance Rmin from the other end of segment L1, and the other of the rise flank and the fall flank is formed having a main drive segment L2 flanked by a T3 transition segment ascending from radial distance Rmin from one end of segment L2 and a T4 transition segment approaching radial distance Rmax from the other end of segment L2, the main drive segments formed according to at least one first function and the transition segments formed according to at least one second function, and
wherein the translating device comprises a plurality of radially extending slots and a plurality of elements, with a respective one of the elements associated with a respective one of the radially extending slots and capable of traveling radially within said respective one of the radially extending slots.

10. Apparatus of claim 9 wherein the devices each define a respective central passageway extending along said axis to provide an accessible orifice extending along said axis.

11. Method for translating motion from a first to a second velocity in an apparatus having a conjugate pair of devices rotatable about a common axis, and translating means operably connected to the conjugate pair about the common axis, for translating motion of a first of the devices at a first velocity to motion of a second of the devices at a second velocity, the first of the devices coupled to an input of the translating means and the second of the devices coupled to an output of the translating means, said translating means comprising a slotted device, whereby motion of one of the devices can be translated to motion of another of the devices via said translating means, said method comprising the steps of:

providing the first of the pair of devices with a first cam having a first number of lobes, providing the second of the pair of devices with a second cam having a second number of lobes, nesting said devices such that the cams face each other radially with said slotted device mounted between the facing cams and said slotted device having radially extending slots, receiving rolling elements in the radially extending slots of the slotted device, the rolling elements traveling radially in communication with the cams, providing each of the cams with at least one rise flank and at least one fall flank, and forming at least one of said flanks on each of said cams with a main drive segment according to a first function and with at least one transition segment according to a second function.

12. The method of claim 11 further comprising the steps of selecting, at a minimum, first piecewise continuous mathematical functions in polar coordinates, generating said main drive segments as a radius in terms of polar angle using said first mathematical functions, selecting, at a minimum, second piecewise continuous mathematical functions in polar coordinates, and generating said at least one of said transition segments as a radius in terms of polar angle using said second mathematical functions.

13. Method of claim 12 further comprising the steps of:

selecting a point defined as Rmax on said flanks where the polar radius is maximum to lie on said at least one of said transition segments, selecting a point defined as Rmin on said flanks where the polar radius is minimum to lie on said at least one of said transition segments, extending said at least one of said transition segments across an angle defined as a first modification angle on either side of said Rmax, extending said at least one of said transition segments across an angle defined as a second modification angle on either side of said Rmin, and forming said main drive segment to be continuous with said at least one of said transition segments at ends of at least one of said first and said second modification angles.

14. Method of claim 13 further comprising the steps of:

defining polar slopes at said Rmax and said Rmin to be zero, and defining polar slopes at ends of at least one of said modification angles to be continuous between said main drive segment and said at least one of said transition segments.

15. Method of claim 14 further comprising the steps of:

selecting said first modification angle using a first conjugate constant common to both said drive cam and said driven cam, such that said first conjugate constant equals the product of said first modification angle and number of lobes on each said cam, selecting said second modification angle using a second conjugate constant common to both said drive cam and said driven cam, such that said second conjugate constant equals the product of said second modification angle and number of lobes on each said cam, thereby preserving conjugate action between said drive cam and said driven cam.

16. Apparatus of claim 1 wherein one of said devices comprises a housing part, further comprising a cover, said housing part and said cover defining therebetween a motor-receiving channel for receipt of a motor to drive said input when said cover is mounted on said housing part.

* * * * *